Dec. 8, 1959   F. D. BUTLER   2,915,876
AXIALLY OPPOSED DUAL ROW JET REACTION TURBINE
Filed June 23, 1958   5 Sheets-Sheet 1
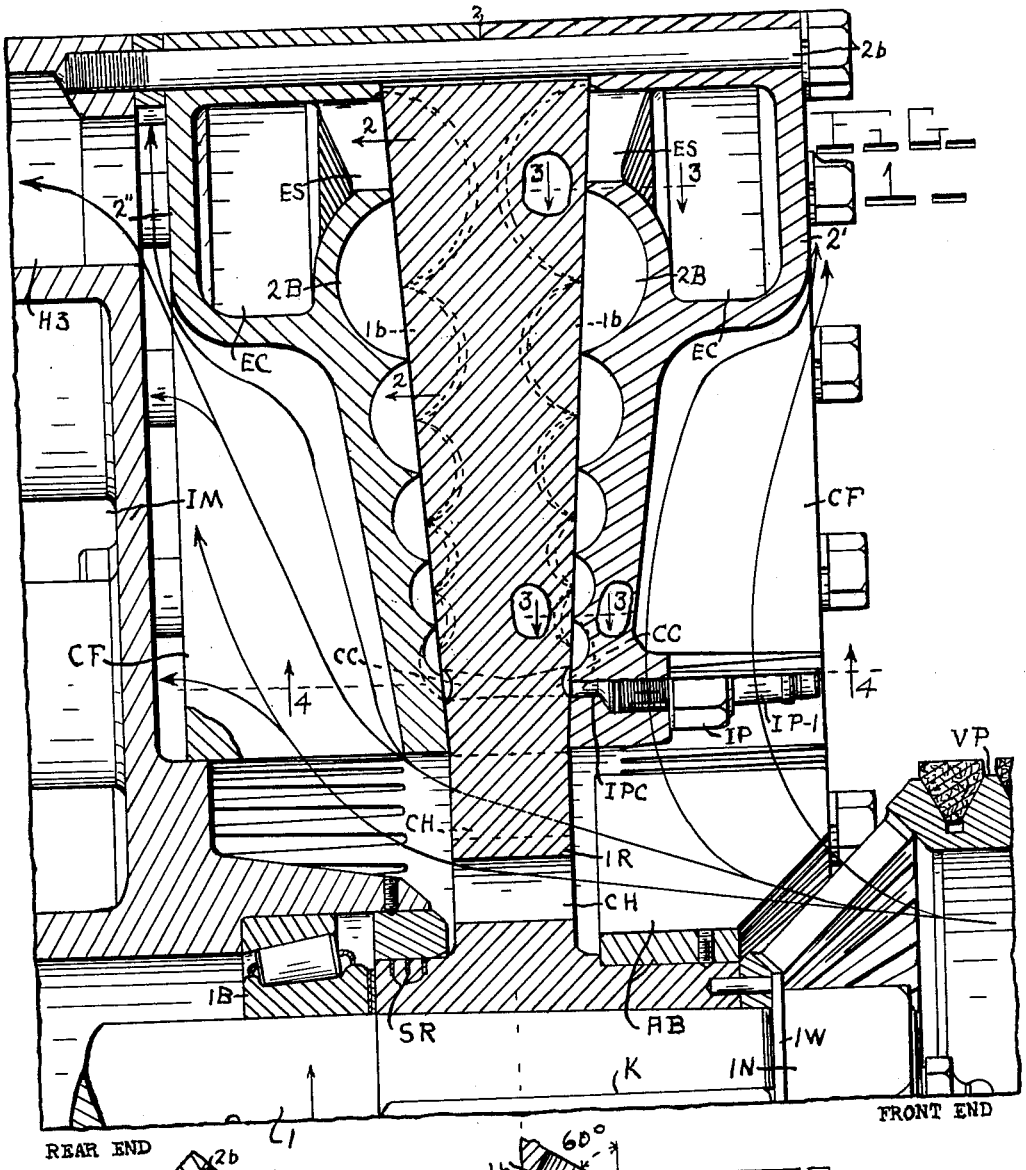
FIG-1
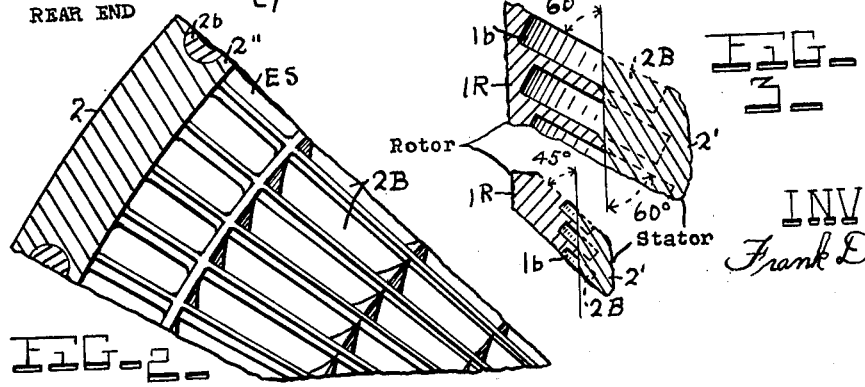
FIG-2
FIG-3
INVENTOR.
Frank David Butler

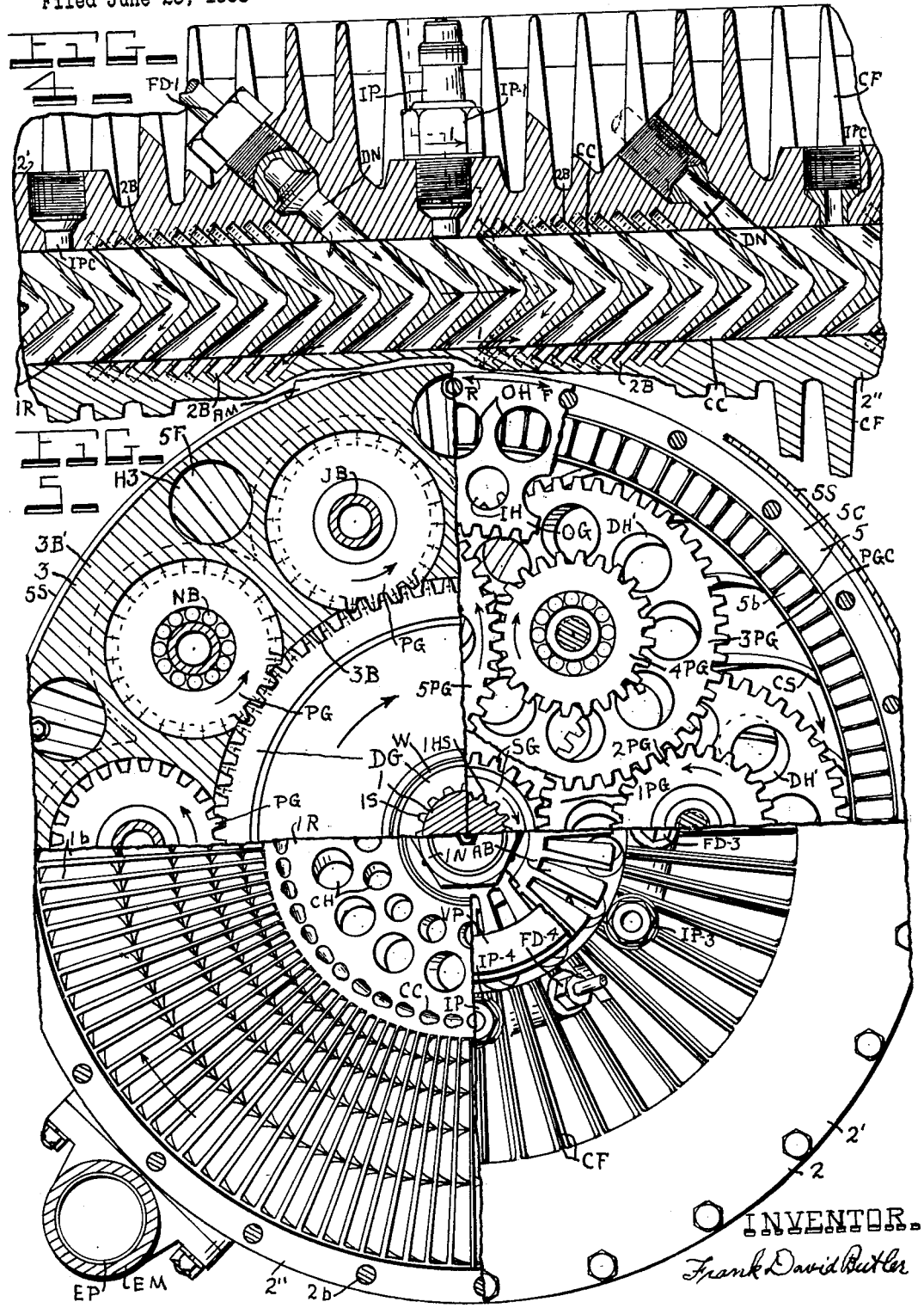

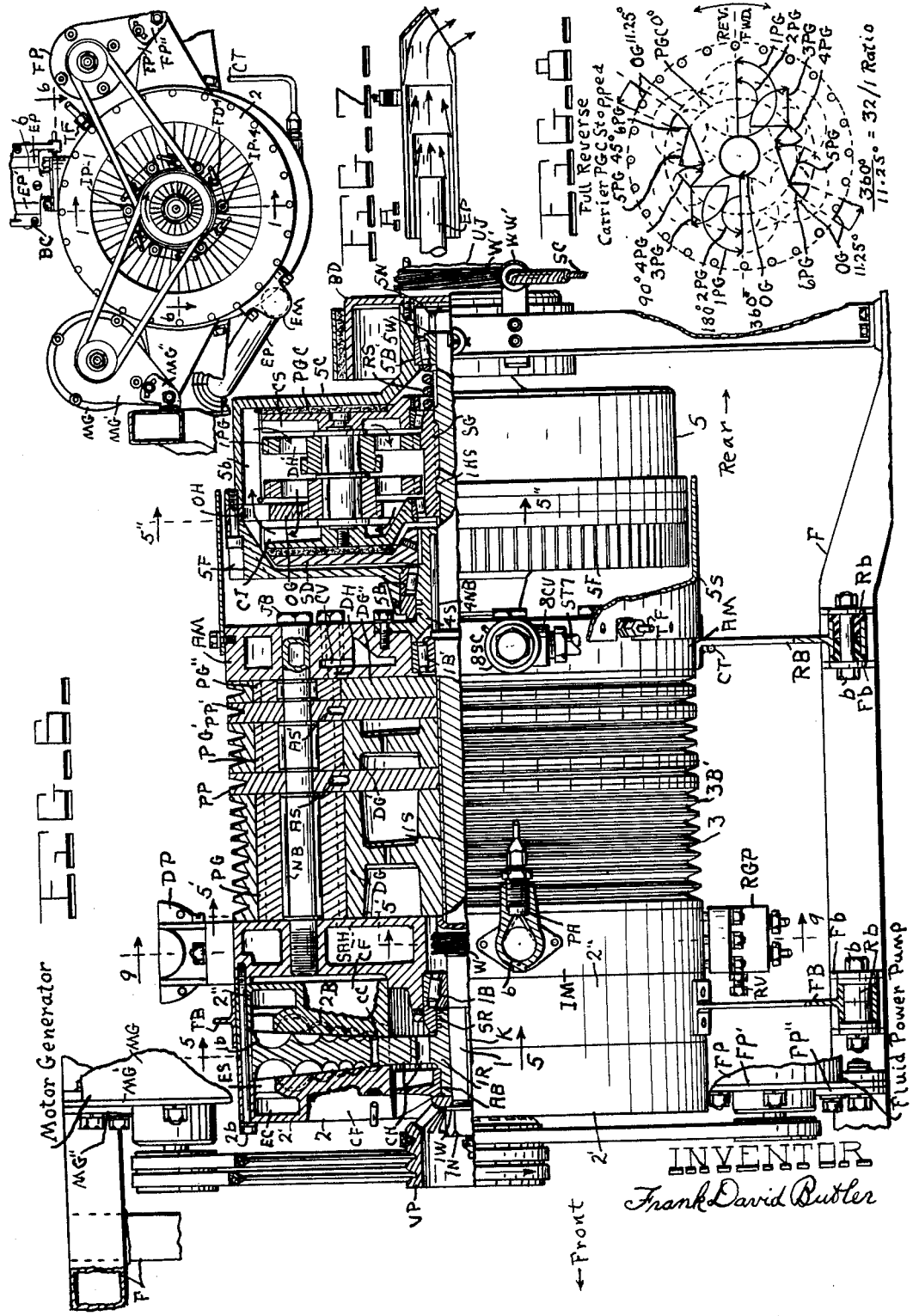

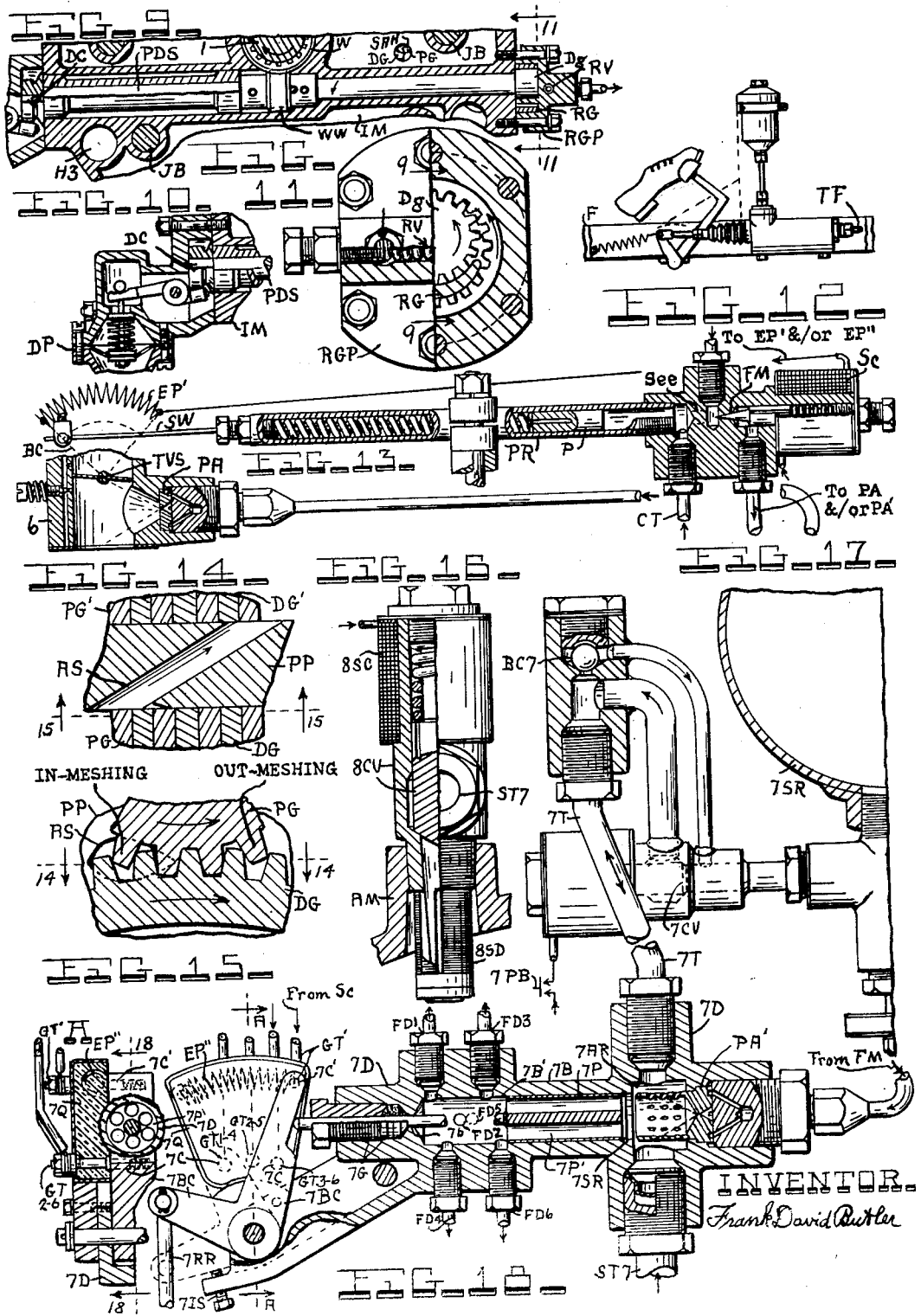

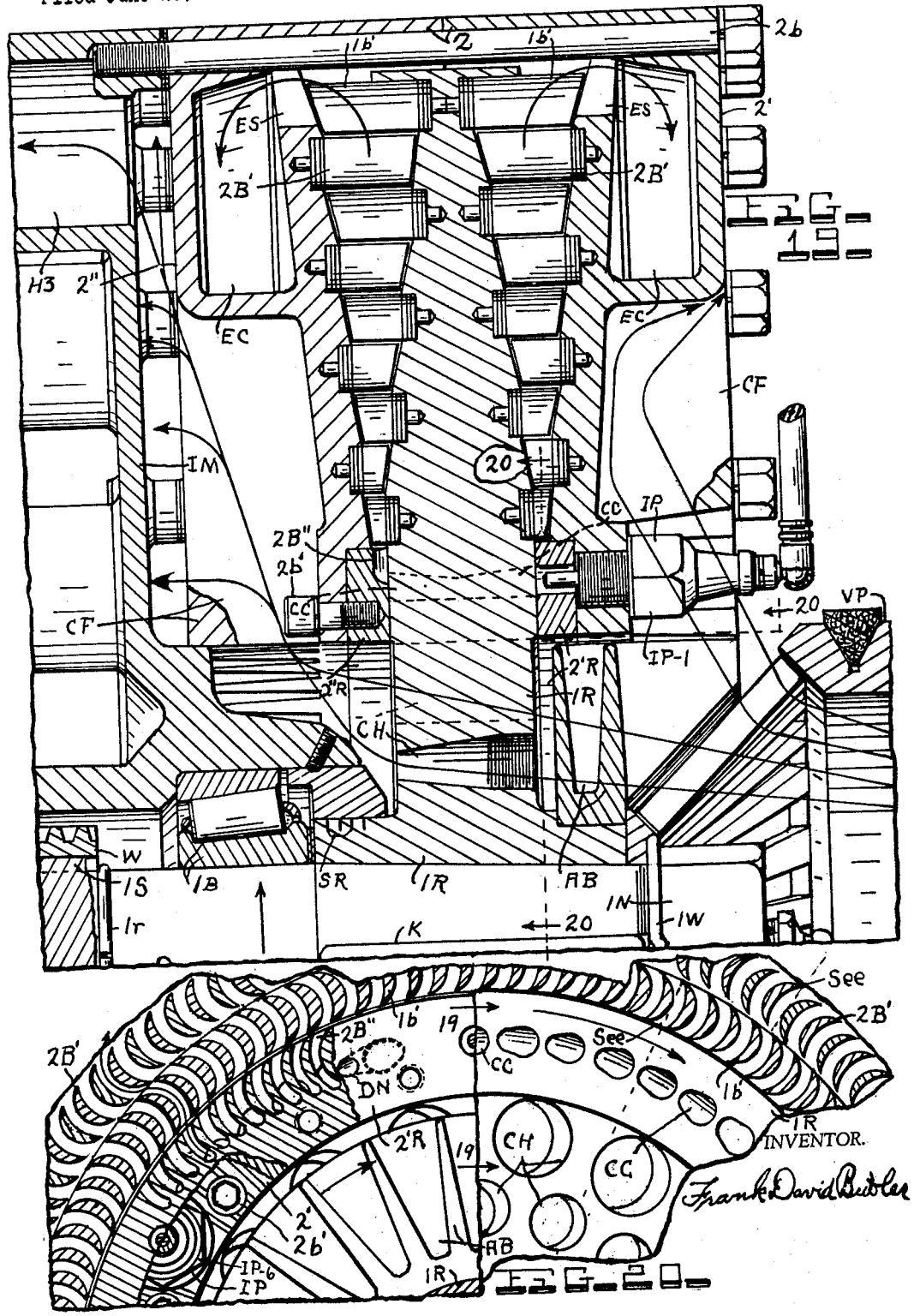

United States Patent Office 2,915,876
Patented Dec. 8, 1959

2,915,876

AXIALLY OPPOSED DUAL ROW JET REACTION TURBINE

Frank David Butler, Venice, Calif.

Application June 23, 1958, Serial No. 743,873

15 Claims. (Cl. 60—39.35)

While my invention relates to combustion turbines in general it applies more specifically to a new type of V-shaped, multiple annular row axially opposed, converging nozzled reaction jet type of expansion combustion chambered, as combined with multiple annular row, increasing in capacities radially outward axially opposed, pressure velocity compounded radial flow, curve bucket expansion chamber type of, internal combustion turbine, provided with low volatile solid liquid fuel pressure atomizing and injecting, multiple expansion group controllable, flame type of non-smog-producing ignition, and, provided in conjunction with its respective elastic fluid compressor, and pressure variable ratio reversible transmission coupler, in forming a unit motive power assembly applicable as the motive power means of an automotive vehicle.

As illustrated herein my internal combustion turbine is used in conjunction with my multiple geared and pressure stage compounded elastic fluid compressor, Patent No. 2,876,947, issued March 10, 1959, as its compressor, and my pressure variable ratio reversible, combined torque converter and automatically operative transmission coupler, Patent No. 2,799,182, as its respective coupler, in forming such unit motive power assembly, and which latter is provided with an elongated one direction rotative shaft extending throughout such assembly as the common driving means thereof. However as either such compressor and/or such coupler may be replaced by other similar means, neither will be described in detail herein.

The major concept and improvement, as indicated and mentioned in the foregoing preamble of the specification, is the provision the V-shaped, reaction jet type of axially pressure balanced expansion, combustion chambers, which form the basis of the invention as combined with the type of, similarly pressure balanced, pressure velocity compounding curved expansion chamber buckets as used therewith. In such turbine, two axially opposed annular inner rows of, relatively small, stator expansion chamber buckets are provided cooperative with the adjacent two axially opposed annular rows of outer ends of said V-shaped combustion chambers; wherein at such location, due to being divided up into expansion groups, such expansion chamber buckets are incomplete as rows, are provided curved, in opposite to direction of rotor rotation and are each increased in length radially and in depth axially starting adjacent the ignition plug of their respective expansion group and extending, in the direction of rotor rotation, to adjacent the next expansion group fuel mixture diffuser nozzle. Providing two methods of curved stator and curved rotor radial flow expansion chamber buckets that may be used in combination with said V-shaped combustion chambers within the turbine, namely; the semi-circular type buckets that may be machined diagonally axially into the adjacent side faces of the turbine stator and turbine rotor respectively, in opposite to, and in the direction of, rotor rotation, and, the conventional axially extending inserted blading type, in which latter the stator and rotor blade buckets are respectively inserted into the adjacent side faces of the turbine stator and turbine rotor and are respectively curved, in opposite to, and in the direction of, rotor rotation. Providing in both types of adjacent annular shaped rows of expansion chamber buckets that the capacities thereof increase radially outward in both the stator and rotor, with said two opposed incomplete inner rows of stator buckets cooperative with the adjacent outer ends of said V-shaped combustion chambers as previously mentioned. Providing two opposed rows of elongated axially extending radial exhaust slots, one row in each stator half, which each connect the adjacent outer row of rotor buckets with an adjacent exhaust cavity in each such stator halves. Providing an elongated one direction rotatable turbine rotor shaft which extends axially within and is the common driving shaft of the entire unit motive power assembly, including the turbine, its elastic fluid compressor and its reversible power delivery transmission coupler. Providing a means for braking such coupler, also a means, attached to such braking means for driving a speedometer cable. Providing a worm operative by said driving shaft for operating a diaphragm type fuel supply pump, and a geared type of solid fuel injection pump through a worm-wheel and its extension shaft. Also providing a manually operative combined control and distributing unit, provided with an insulated quadrant, for simultaneously controlling the distribution of compressed elastic fluid and ignition electricity to the expansion groups of the turbine, as well as controlling the lift of a spring-loaded solenoid coil operative fuel metering valve, which latter supplies a measured quantity of solid fuel, through a pressure atomizer to within said distributing unit, in proportion to the quantity of compressed elastic fluid being delivered therethrough to said turbine.

Also unique additional minor improvements as will be disclosed hereinafter as the specification description progresses.

With reference to the figures of the drawings: Fig. 1 is a longitudinal section through my semi-circular bucket type of, dual radial flow pressure velocity compounded turbine as on the dotted line 1—1 of Fig. 7; Fig. 2 is a detail elevation as along the dotted line 2—2 of Fig. 1; Fig. 3 is detail sections, in plan, as along the plurality of dotted lines 3—3 of Fig. 1 and illustrate less angle of inner than of outer buckets; Fig. 4 is an enlarged plan section of the V-shaped reaction combustion chambers, and dual opposed expansion groups as along the radius of the dotted line 4—4 of Fig. 1; Fig. 5 is jointly in front elevation and in a series of transverse sections of the unit motive power assembly, Fig. 6, with the lower right 90° in broken away front elevation, then reading clockwise, with the adjacent 90° section as on the dotted line 5—5 of the turbine, the adjacent 90° section as on the dotted line 5'—5' of the compressor, and, the adjacent 90° section as on the dotted line 5"—5" of the coupler; Fig. 6 is a joint plan and section of the unit motive power assembly as mounted in an automotive vehicle framing and as taken along the dotted and broken line 6—6 of Fig. 7; the latter is a miniature front elevation of the assembly of Fig. 6, and wherein "A" is a detail longitudinal section through the turbine combined exhaust pipe and air diffuser muffler; Fig. 8 is a diagrammatical sketch of my pressure variable ratio reversible transmission coupler, Patent No. 2,799,182, issued July 16, 1957, as may be applicable to this assembly, and illustrates by pitch-circles the relative rotation of the sun-gear, the six opposed, tandem compounded planet-gears, and, the orbit gear with the planet-gear-carrier stopped; Fig. 9 is a fragmentary transverse section on the dotted line 9—9 of Fig. 6, and illustrates the driving means for the diaphragm and gear pumps; Fig. 10 is a detail section of the diaphragm pump drive means; Fig. 11 is jointly an enlarged end elevation and transverse section of the rotary geared fuel injection pump as on the dotted line 11—11 of Fig. 9; Fig. 12 illustrates means for supplying fluid under a variable pressure to within the coupler of Figs. 5, 6 and 8; Fig. 13 is a sectional view through the combined compressor regulator and the solenoid coil operative fuel metering valve; Fig. 14 is a section in plan through Fig. 15 on the dotted line 14—14 thereof, and illustrates the diagonally extending communication slot extending through a baffle partition from the inmeshing sides of the adjacent lower pressure stage to the outmeshing sides of the adjacent higher pressure stage gearing of the compressor; Fig. 15 is a transverse section on the dotted line 15—15 of Fig. 14; Fig. 16 is a detail of the combined multiple disc strainer and outlet check-valve of the compressor accumulator manifold; Fig. 17 is a diagrammatical illustration of a compressed elastic fluid starting circuit means for the turbine; Fig. 18 is a longitudinal section throughout the combined turbine control and distributing unit, while the insert "A" is a transverse section on the dotted line A—A through the electrical potentiometer for controlling the solenoid coil operative fuel metering valve, and also through the electrical contacts for grounding the ends of the primary windings of three vibrating contact point primary, nongrounded secondary, ignition induction coils (not illustrated) which each may supply two ignition plugs simultaneously; Fig. 19 is a longitudinal section through the relatively more expensive inserted bucket type of, dual radial flow pressure velocity compounded turbine as on the dotted line 19—19 of Fig. 20; and, the latter is a broken away end elevation and transverse section as on the dotted and broken line 20—20 of Fig. 19 and illustrates the detail of cooperation between the combustion chambers and the stator and rotor buckets of the turbine.

With reference to the symbols of the drawings, similar symbols represent and indicate similar parts in the several figures: The numeral 1 indicates the elongated rotor shaft which extends throughout the unit motive power assembly as the common driving shaft thereof for rotatively driving the multiple staged driving gears DG, DG' and DG" of the multiple pressure staged compounded elastic fluid compressor 3, and the sun-gear SG of the quadruple planetary geared compounded, pressure variable ratio reversible, transmission coupler 5. This shaft 1 is rotatively journalled upon the opposed pair of adjustable roller bearings 1B and 1B' (Fig. 6) concentrically with the axially opposed rows of open ends of the V-shaped combustion chambers CC of the turbine rotor 1R, the axially opposed rows of different lengths of stator buckets 2B of the opposed turbine stators 2' and 2" of the turbine stator 2, the elongated bore 3B of the compressor body 3B', and, to the coupler casing 5C, and is also journalled upon the set of needle bearings 4NB, in the coupler stator 4S, and the adjustable roller bearing 5B' in the rear end of said coupler casing 5C. The latter is rotatively journalled upon said stator 4S and said shaft 1 respectively upon the opposed pair of adjustable roller bearings 5B and 5B', which latter is provided with the tongued locking washer 5W and the adjustment nut 5N. The coupler end of said shaft 1 is provided with the external helical spline 1HS which rotatively drives the coupler sun-gear SG and also provides the latter and the coupler planet-gear-carrier PGC with an axial thrust to the right in Fig. 6. The intermediate portion of said shaft 1 is provided with a spline 1S for rotatively driving the previously mentioned driving gears of the compressor 3. The 1st stage driving gear DG may be provided with a worm W (Figs. 5, 6 and 9) for rotatively driving the fuel pumps.

With reference to Figs. 1 to 7 inclusive, the radially extending disc shaped turbine rotor 1R is secured to rotate in one direction with the shaft 1, between the pair of opposed diverging stator halves 2' and 2", and is provided with: a row of series of V-shaped combustion chambers CC with the ends thereof each extending from the adjacent side of said rotor convergingly, in the direction of rotor rotation, to the center of the width of such rotor at which point they unite; a plurality of series of opposed rows of similar semi-circular shaped progressively increasing in length and depth and diagonal pitch angle radially of rotor expansion chamber buckets 1b, machined into the opposite sides of the rotor in the direction of its rotation and with the inner ends of the smaller of such buckets originating a relatively short predetermined distance outward radially from the adjacent ends of said combustion chambers CC, and with the outer ends of the largest of such buckets 1b terminating closely adjacent to the periphery of said rotor; a plurality of rows of diagonally axially extending air circulating holes CH extending through said rotor inward radially from said combustion chambers; an air circulating blower AB provided with a series of diagonally axially extending multiple vanes and a hub portion secured over and shouldered against the front hub end of said rotor; a combined multiple V-grooved pulley VP and air circulating blower secured adjacent the front face of said front hub of said rotor by the tongued locking washer 1W and the securing nut 1N of such rotor; the key K for shaft 1, pulley VP and rotor 1R; and, a series of snap-ring type of non-rotative fluid seal rings SR disposed externally in the rear hub portion of said rotor.

With reference to Figs. 1 to 7 inclusive, the turbine stator is constructed in two annular shaped, radially diverging, axially opposed halves 2' and 2", which are bolted together and secured concentrically with and to the compressor inlet manifold IM by the series of symmetrically spaced bolts 2b, and fit closely along their diverging sides with the adjacent sides of said rotor 1R, and are each provided with: a series of opposed rows of similar semi-circular shaped turbine expansion chamber buckets 2B, wherein each adjacent row of buckets increases in length and depth and diagonal pitch angle radially outward, and wherein each bucket is machined into its respective opposed stator in opposite to the direction of rotor rotation, and with the inner ends of the smallest buckets originating adjacent the opposed open ends of said combustion chambers CC and each opposed row of such opposed stator buckets 2B extending radially outward almost to the center of the length of the next larger row of rotor expansion chamber buckets 1b; a row of series of axially extending elongated radial exhaust slots ES, located in each stator half 2' and 2", which slots connect the outer half of the largest rotor buckets 1b with the adjacent exhaust cavity EC of its respective stator half; means for bolting an exhaust manifold EM to both of such stator halves, and which manifold EM is connected to an exhaust pipe EP which latter is formed into a combined exhaust diffuser silencer and excess air induction muffler M, Fig. 7-A, that requires no exhaust tail pipe and mixes the exhaust gas with heated air which results in an upward draft which tends to eliminate smog; and, a series of radially extending cooling fins CF, integral with each stator half.

The front stator half 2', is provided with a series, of six in the example case illustrated, of paired fuel supply diffuser nozzles DN and ignition plugs IP, which each extends through such front stator half and terminates adjacent the front ends of the adjacent V-shaped combustion chambers CC and divides the turbine into six, in the example case, of dual opposed pressure velocity compounding expansion groups, wherein the inner rows of opposed stator buckets 2B are not continuous and are increased in length and depth progressively in an arc starting adjacent the respective group ignition plug IP and extending, in the direction of rotor rotation, to adjacent the next group diffuser nozzle DN, as illustrated in Figs. 1 and 4.

In my compressor, U.S. Patent No. 2,876,947, issued March 10, 1959, the 1st, 2nd and 3rd stage driving gears and series of pinion gears respectively DG, DG' and DG'' meshing with PG, PG' and PG'', are all rotatively journalled and mounted within the compressor body 3B', as illustrated in Figs. 5 and 6; while 3B', including the annular stage diaphragms PP and PP' are secured, concentrically between the front cored inlet manifold $IM_x$ and rear cored accumulator manifold AM, with the series of elongated, hollow, combined journal and securing bolts JB; and, the interstage suction and discharge ports of the compressor are contained within the compressor.

In my coupler, U.S. Patent No. 2,799,182, issued July 16, 1957, there are two sets of tandem paired compounding planet-gears 1PG–2PG, 3PG–4PG and 5PG–6PG, with the sets located 180° apart as in Fig. 8, all carried in planet-gear-carrier PGC, with 1PG meshing with SG and 6PG meshing with orbit gear OG; with fluid circulation in 5 as indicated by arrows Fig. 6; at turbine idling speed, PGC may be variably pressure braked against stator disc SD, thereby reversing OG, while at above idling speeds, PGC may be variably pressure clutched against 5C; and, wherein such coupler the variable range in reverse rotation extends from 1,000 to 1, to 32 to 1 ratio, while in forward rotation it extends from 1,000 to 1, to a 1 to 1 ratio, and, is a torque converter in forward rotation.

The coupler casing 5C is provided with a row of series of air circulating fins 5F for inducing cooling air from the turbine stator 2 through the hollow bolts JB, and from adjacent IM through the axial air circulating holes H3 in 3B' and AM. Such casing 5C is also provided with an emergency brake drum BD, secured to its rear and/or right end Fig. 6, and also a universal joint UJ secured to such end, and, wherein UJ is provided with a worm W', external thereto, for rotating a worm-wheel WW' which latter rotatively drives the speedometer cable SC, which latter rotates relative to delivery speed of the coupler.

With reference to Figs. 6, 7 and 13, the carburetor 6, may be provided with an electrical heating element which may be located under the carburetor bowl and be operated by the electrical potentiometer EP, which latter is operated by the throttle-valve-stem TVS, and which heater, would be for reducing the viscosity of the fuel in 6. The latter may also be provided with a similar potentiometer EP' similarly operated by TVS and for operating the solenoid coil Sc of the fuel metering valve FM for supplying surplus fluid under pressure from the base of AM to the pressure atomizer PA, and through the latter injecting it back into suction of compressor 3. The throttle-valve-stem TVS is operated by the compressor regulator PR, which latter may be connected to the accumulator manifold AM, on one side of its piston P, by the connection tubing CT and is spring-loaded on the opposite side of P and connected by the spring-wire SW to the bell-crank BC of TVS. Thus whenever the pressure of the surplus fluid from AM is less than the spring-load setting of PR, then the piston P opens the throttle-valve-stem TVS and simultaneously reduces the grounding resistance of EP and EP', so the carburetor heater is placed into service and the solenoid coil Sc of the fuel metering valve FM opens such valve and surplus fuel is injected through the pressure atomizer PA into carburetor 6 below TVS, and vice versa if such spring-load setting is exceeded by the pressure in PR.

With reference to Figs. 5, 6, 7 and 16, the combined outlet check-valve 8CV and adjustable strainer 8SD is operated by the electrical solenoid coil 8SC as follows: Whenever the primary electricity of the ignition supply is placed into service and the pressure in the accumulator AM is above a predetermined pressure, then 8SC opens 8CV, and compressed elastic fluid may flow from AM through supply tubing ST7 into the control distributing valve 7D, and vice versa.

While the motive power assembly is normally started by the 12 volt D.C. electrical motor generator MG, it may simultaneously be started with compressed elastic fluid from reservoir 7SR (Fig. 17) providing the electrical supply to MG and to the solenoid coil 7SC of the check-valve 7CV are in parallel and/or the turbine may be started by such compressed elastic fluid alone through operation of the push-button 7PB. Such pressure starting means may consist of: At any time while the turbine is in operation the reservoir 7SR is charged from the accumulator AM through check-valve 8CV, thence supply tubing ST7, thence control valve 7D, thence tubing 7T, thence past ball-check valve 7BC7, and, into 7SR. Thus assuming that the pressure in AM is too low to open check-valve 8CV when electricity is supplied to the ignition system and simultaneously to solenoid coil 8SC and said push-button 7PB. Then operation of the latter would result in compressed elastic fluid being released from 7SR past the check-valve 7CV and through tubing 7T into the control valve 7D. Once the turbine started rotating, ignition of the combustion charges in chambers CC (Fig. 4) would be by direct flame contact within the spark-gap collars IPC.

The carburetor 6 is supplied with diesel fuel by the usual type diaphragm pump DP (Fig. 10), which along with the rotary geared pump RGP (Fig. 11) is operated by the shaft 1 through the worm W and worm wheel WW (Fig. 9) rotating the pump drive shaft PDS, which latter rotates the drive-cam DC for pump DP, and the drive-gear Dg of the pump RGP, and, wherein Dg rotates the rotor gear RG. In practice either one of two methods of fuel supply may be used. In the first method, all the fuel used would be induced into the compressor 3 from the carburetor 6 through the inlet manifold IM, and any solid fuel accumulated in the base of the accumulator manifold AM would be pressure atomized and injected back into 6 beneath its throttle valve stem TVS, as previously described. This would insure ample lubrication of the compressor gearing. In the second and/or preferred method the carburetor spray-nozzle would be blanked off, atomizer PA would not be used, and only filtered air would pass through the throttle valve. The base of AM would then be used for supply of a vegetable lubricating oil such as castor and/or olive oils which would be recirculated within compressor 3. The pump RGP would then take diesel fuel suction from the bowl of 6 and would discharge through the fuel metering valve FM (Fig. 13), and the pressure atomizer PA' (Fig. 18) into the end of the control valve 7D. The solenoid coil Sc of valve FM would then be controlled by the potentiometer EP'' (Fig. 18) which may be made variable by a remotely controllable variable resistance in series between Sc and EP'', while the discharge pressure of pump RGP would be limited by the setting of the relief-valve RV thereof, and, wherein other factors to be considered would include the size of the orifice in PA', the adjustment setting of FM, and the capacity of the resistance of EP''.

With reference to Figs. 1 to 7 inclusive and 18, the turbine control and distributing valve 7D is operative by the usual foot accelerator of an automotive vehicle, and is a means for controlling the number of fuel delivery diffuser nozzles DN and ignition plugs IP that are placed into and/or out of service, and simultaneously controlling the metering of the quantity of atomized solid fuel that will be injected into the compressed fuel mixture that is proportioned within said valve 7D in accordance with the number of such nozzles placed into and/or out of service thereby. With reference to Figs. 18 and 18–A, the combined control and distributing valve 7D consists of: an elongated cast body portion 7B provided with an elongated central bore 7B' having a reduced bore 7b in tandem therewith at one end thereof, provided with an adjustable packing gland 7G, and a pressure fuel atomizer PA' adjacent its opposite end, with a plurality of radially extending progressively openable and/or closable fuel delivery tubing fittings FD and a pair of non-closable oppositely located tubing fittings ST7 and 7T all located intermediately to the ends thereof and opening into said bore 7B'; an elongated stepped diameter piston 7P with the larger diameter portion slidable within bore 7B' and the smaller step diameter portion slidable within gland 7G and provided with a series of symmetrically spaced communication holes 7P' extending longitudinally through the larger diameter portion thereof, and wherein such piston is normally displaced away from said atomizer PA' by elastic pressure and is displaced towards said atomizer PA' manually by the bell-crank 7BC, and is limited in the latter displacement by a snap-type stop ring 7SR which is located in bore 7B' adjacent an enlarged annular shaped recess 7AR connecting fittings ST7 and 7T; wherein said bell-crank 7BC is pivoted in a forked end of the body portion 7B, is manually oscillatable by the reach-rod 7RR, is limited in its piston-valve opening travel by said stop ring 7SR, is stopped in its piston-valve closing travel by the turbine idling stop-screw 7IS, and, is provided with a plurality of spring-loaded electrical contacts 7C and 7C' respectively for grounding the primary windings of the three ignition induction coils previously mentioned, and wherein 7C' is for grounding the potentiometer EP''; and, a non-oscillatable electrically insulated quadrant 7Q, secured to 7B, containing the grounding terminals 7GT of the primary windings of said ignition coils and the potentiometer EP''. With further reference to distributor 7D, the following should be noted: the fittings FD are arranged in an opening sequence of FD1, FD4, FD2, FD5, FD3 and FD6; while the ignition coil grounding terminals GT, in the quadrant 7Q, are in the sequence of GT1–4, GT2–5 and GT3–6; and, that two ignition plugs IP are thus placed into and/or out of service simultaneously. Thus it is apparent, that under turbine idling conditions of operation, only fitting FD1 and its respective fuel diffuser nozzle DN would be in reduced service, and only GT1–4 and their respective ignition plugs IP would be in service along with the 1st duel pressure velocity compounding expansion group of the turbine, while the compressed elastic fuel mixture within the V-shaped combustion chambers CC would be under direct flame contact (continuous train type of) ignition. Further movement of 7BC and piston 7P to the right Fig. 18 would place FD4 and its respective diffuser nozzle DN in service along with the 2nd dual pressure velocity compounding expansion group of the turbine. During such movement of 7BC and 7P, the spring-loaded contact 7C, in 7BC, would tend to place terminal GT2–5 into and GT1–4 out of service, and simultaneously the spring-loaded contact 7C' would be decreasing the grounding resistance of the potentiometer EP'' which would result in increasing the magnetic lift power of the solenoid coil Sc, of the fuel metering valve FM (Fig. 13), so a greater quantity of fuel would be atomized and injected, through the pressure atomizer PA', into the right end of the control valve 7D in proportion to the number of fittings FD1 and FD4 in service; and, vice versa as 7BC and 7P are manually moved to the left in Fig. 18 by the reach rod 7RR. In order that the turbine may be started on a rich mixture and then reduced to a relatively lean mixture, a remotely operable variable resistance may be inserted in series between Sc and EP''.

In order to attain supremacy in dual radial flow, axially pressure balanced, pressure velocity compounded turbines, the latter may be constructed as in Figs. 19 and 20 and may be manufactured as follows: the turbine rotor buckets 1b', stator buckets 2B', annular shaped stator rings 2'R and 2''R and rotor 1R may all be of nickel, chrome-molybdenum and/or stainless steel metal; the similar buckets 1b' and 2B' may all be machined from hot-rolled and formed lengths of bucket materials and each be provided with a cylindrical pilot end and an adjacent circumferentially extending serration as illustrated; the stators 2' and 2'' may be made of Dural metal, and the annular shaped grooves machined therein and in the side faces of the rotor 1R should be serrated and of less width than the stator buckets thereof so as to produce reaction expansion within the turbine buckets, see right side of Fig. 20; such buckets should then be assembled in their respective stator or rotor by first pressing each bucket into its respective pilot hole, until it rests upon its respective groove slot base, then rotating it into the adjacent serrations in the sides of such groove; after all buckets are rotated into place, then the rotor buckets 1b' may all be hard soldered to flush with depth of grooves, while the buckets 2B' may all be heliarc welded, similarly flush with depth of grooves, and thereby to abolish the T-shaped relatively expensive type of buckets; the heat resisting annular shaped stator rings 2'R and 2''R may each be secured within their respective stators 2' and 2'' by the socket headed cap-screws 2b', both of such rings being provided with a series of increasing in lengths of semi-circular shaped curved stator buckets 2B'' with one series for each expansion group of the turbine, and with only the front ring 2'R provided with a diagonally axially through extending diffuser nozzle DN and an adjacent through axially extending ignition plug spark-gap recess therein for each such expansion group; and, so that all fuel delivery fittings FD and ignition plugs IP may extend axially through stator 2', while the worm W may be located between the gear DG and the snap-ring 1r over the spline 1S of the rotor shaft 1, extending throughout the unit motive power assembly.

Assuming the displacement of the 1st stage drive gear DG to be, each revolution thereof, by formula: Teeth in DG × length DG × width of each tooth on pitch line × working depth of each tooth × (2 × number of pinion gears PG); substituting we have $72 \times 3.5'' \times 3/16'' \times 1/4'' \times 20 = 236.2$ cubical inches of displacement each revolution of DG. Now assuming the compressor delivers the compressed elastic fluid to the accumulator under 11 atmospheres and/or 147 lbs. gauge pressure, thus there would be about $236.2/11 = 21.5$ cubical inches of compressed fluid delivered under 147 lbs. gauge pressure during each revolution of DG. Now assuming that there are 48 V-shaped combustion chambers CC in the turbine rotor 1R, thus there would be 48 twin explosions for each diffuser nozzle DN during each revolution of 1R. Then as there are six diffuser nozzles with an axially balanced twin expansion group for each DN, we would have 288 explosions and 576 expansions during each revolution of 1R. Each combustion chamber CC should be $21.5/288 = .075$ cubical inch in capacity. Thus due to direct flame contact ignition and the relatively high delivery pressure of 147 lbs. on the elastic fuel mixture, the turbine should operate under non-smog $CO_2$ (carbon dioxide) exhaust at all operating speeds while using atomized solid diesel fuel injection.

Normally the unit motive power assembly could be supported from the vehicle framing F upon two forward FB and two rear RB brackets with the rear end slightly lower, and with FB secured to stator 2 or the inlet manifold IM, and RB secured to manifold AM at their inner ends, and both pivot bolted, by b in rubber bushings Rb within forked brackets Fb welded to framing F, at their outer ends. The motor generator MG and the fluid power pump FP are secured to their respective brackets MG' and FP', which latter are each adjustably pivoted in their respective slotted securing brackets MG'' and FP", which latter are each welded to framing F. At least the top of the coupler casing 5C shold be protected with a shield 5S secured to manifold AM.

Having fully described my invention in one of its best methods of adaption, in conjunction with a unit motive power assembly, to an automotive vehicle, I claim:

1. The provision in an internal combustion turbine of: a radially outward extending one direction rotatable turbine rotor that is provided on either side face thereof with a series of adjacent annular rows of progressively radially outward increasing in diameters of semicircular shaped rotor expansion chamber buckets with each row machined at an angle to the adjacent side face of the rotor into the latter in its direction of rotation and with the machining angle of each adjacent row progressively increasing towards the rotor periphery; an annular row of series of axially extending V-shaped combustion chambers with the ends thereof each extending diagonally convergingly into the side faces of said rotor in the direction of rotation of the latter and terminating into each other and forming a row of combustion chambers on either side of said rotor inward radially a predetermined distance from the smallest diameter rotor buckets; a radially outward diverging extending axially halved type of turbine stator that is provided on each adjacent side face thereof with a series of adjacent rows of progressively radially outward increasing in diameters of semi-circular shaped stator expansion chamber buckets with each row machined at an angle to the adjacent side face of the stator into the latter in opposite to the direction of rotor rotation and with the machining angle of each adjacent row progressively increasing towards the rotor periphery and wherein all such rows of stator buckets, excepting the inner-most row, extend from approximately center to center of the adjacent rows of rotor buckets, while said inner row connects the combustion chambers and smallest rotor buckets; a plurality of rows of series of axially extending radial exhaust slots with one row in each stator half outward radially from the adjacent largest diameter row of stator buckets and oppositely axially from the adjacent outer one-half of the largest diameter row of rotor buckets and each provided to connect the latter with an adjacent exhaust cavity; means in the form of a row of series of fuel mixture diffuser nozzles, located in one-half only of said halved stator and which divide the turbine into expansion groups and are for supplying fuel mixture to each of said combustion chambers in a predetermined manner; means in the form of a row of series of ignition plugs one located in the direction of rotor rotation a predetermined distance from each of said diffuser nozzles and for igniting fuel mixture in each of said combustion chambers in a predetermined manner; and, a jointly operative manual means for controlling the distribution of the fuel mixture to said diffuser nozzles and the ignition supply to each of said ignition plugs in a predetermined sequence manner.

2. The internal combustion turbine of claim 1 characterized by, wherein the innermost row of all of such rows of stator buckets in each half of the turbine stator consists of: dividing each innermost row of stator buckets in each such stator half into paired axially opposed expansion groups with one group of each pair of groups located oppositely in each half of said halved stator and wherein each paired group is provided with one fuel mixture diffuser nozzle and an adjacent ignition plug and wherein each such inner row of stator buckets are relatively smaller in capacity starting adjacent the group ignition plug and increase in capacity in the direction of rotor rotation to adjacent the next preceding expansion group.

3. The internal combustion turbine of claim 1 characterized by, said means in the form of a row of series of dual mixture diffuser nozzles and said means in the form of a row of series of ignition plugs to consist of; a single row of alternately symmetrically spaced diagonally axially extending fuel mixture diffuser nozzles and axially extending ignition plugs, each opening into one row of ends of said series of combustion chambers and wherein the turbine is divided into a series of axially oppositely located twin expansion groups on either side of said rotor, wherein each twin group is provided, in the direction of rotor rotation, with one diffuser nozzle and one ignition plug and wherein such an arrangement provides twin group expansion within the turbine.

4. The internal combustion turbine of claim 1 characterized by, said means for controlling the distribution of fuel mixture and ignition supply to consists of: an elongated control and distributing valve unit provided with an elongated bore closed at one end by a reduced diameter gland and at its opposite end by a liquid fuel pressure atomizer, and provided, adjacent the latter, with an annular shaped recess surrounding said bore, and a round annular shaped snap-ring located in a groove adjacent the opposite side of said recess within said bore, and provided adjacent said recess with a tubing connection to a compressed elastic fluid supply means, and, also a tubing connection to a pressure starting reservoir; an elongated piston provided with a reduced diameter stem end slidable within said gland and a hollow enlarged opposite end slidable within said bore; a manually operated short and long armed bell-crank pivoted in a forked end of said unit adjacent the gland end thereof and limited in its manually operated long arm arc travel by said piston striking said snap-ring, and limited in its opposite, pressure actuated, travel by the short arm contacting an adjustable turbine idling stop screw located in said forked end of said unit; a series of radially extending tubing connections secured in such valve unit and each provided with an access arranged in said bore in such manner as to be progressively opened and/or closed during the slidable travel of said piston and wherein each of said tubing connections leads to one of said diffuser nozzles; an electrically insulated quadrant pivoted with said bell-crank in and secured to the forked end of said unit and provided with an electrical potentiometer located adjacent the full radius arc travel of and contactable by a spring loaded grounding contact located therein said long arm, also provided with a plurality of grounding terminals located at less radius arc travel of and contactable by a similar spring-loaded contact therein said long arm, and, wherein the potentiometer is connected to a solenoid coil operative fuel metering valve for supplying fuel to said atomizer, while said grounding terminals are each connected to the primary windings of separate ignition coils for supplying ignition electricity to each of said ignition plugs.

5. An internal combustion turbine having an axially halved type of annular shaped stator, the provision therein of: a relatively narrow one direction rotative radially extending rotor provided on both sides thereof with a series of annular rows of rotor buckets curved in the direction of rotor rotation and provided increasing in capacities radially outward; a series of through axially extending V-shaped combustion chambers with the ends thereof each extending diagonally convergingly into the sides of said rotor in the direction of rotation of the latter and terminating into each other and forming a row of such chambers, open at their larger ends to the sides of said rotor, a predetermined distance inward radially from the inner row of said series of rows of rotor buckets, on both sides of said rotor, and each capable, of a jet type of reaction diffusion of products of combustion during the normal rotative operation of such turbine rotor; and, a plurality of rows of through diagonally axially extending air circulating holes located inward radially from said row of combustion chambers, within said rotor.

6. An internal combustion turbine having a relatively narrow one direction rotative radially extending rotor, the provision therewith of: an axially halved type, of annular shaped turbine stator provided with its periphery closed and its inner radius concentrically supported, in relation to the axis of rotation of said rotor, upon a compressor member of such turbine, and provided on the adjacent sides of such stator with a series of annular rows of stator buckets curved in opposite to the direction of rotor rotation and provided increasing in capacities radially outward; a plurality of rows of axially extending radial exhaust slots with one row located outward radially from each outer row of stator buckets and each row of such slots provided for forming a baffled access extending between an adjacent row of rotor buckets of said rotor and an adjacent exhaust cavity in said stator; a row of paired fuel mixture diffuser nozzles and ignition plugs symmetrically spaced about the rotor axis and respectively extending diagonally axially, in the direction of rotor rotation, and axially through, one half only of such stator and pairs of such nozzles and plugs terminating in a row a predetermined distance apart from one another adjacent the inner row of stator buckets in such respective half of such stator and respectively provided for supplying a diffused compressed elastic fuel mixture to within each of an adjacent row of through extending combustion chambers, located in an adjacent side of said rotor, and for initially igniting such mixture within each such combustion chamber within said rotor, and also provided for forming expansion groups within the turbine; a plurality of rows of axially extending radial cooling fins with one row extending integral externally with each half of said stator; and, means for connecting an exhaust manifold, located radially outward externally to such stator halves, with each of such exhaust cavities and to a self activating, excess air induction, exhaust diffuser muffler.

7. An internal combustion turbine provided with: a relatively narrow one direction rotative radially extending turbine rotor provided on both sides thereof with a series of annular rows of rotor buckets with each bucket curved in the direction of rotor rotation and provided increasing in capacities radially outward; a series of through axially extending V-shaped combustion chambers with the opposite ends thereof each forming a row located on each side of the rotor and each end of each combustion chamber extending diagonally convergingly into the adjacent side of said rotor in the direction of rotation of the latter and terminating together at the point of the V therein such rotor and wherein each opposite end of each combustion chamber is capable of a jet type of reaction diffusion thrust from the expanding products of combustion during the normal rotative operation of such turbine rotor; a plurality of rows of through diagonally axially extending air circulating holes located within said rotor inward radially from said row of combustion chambers; an axially halved type of annular shaped turbine stator provided with its periphery closed and its inner radius concentrically supported, in relation to the axis of rotation of said rotor upon an elastic fluid compressor member of and for such turbine, and provided on the adjacent sides of such stator with a series of rows of stator buckets curved in opposite to the direction of rotor rotation and cooperative with the adjacent rows of rotor buckets; a plurality of rows of axially extending radial exhaust slots with one row located outward radially from each outer row of stator buckets within such halves of such stator and each row of such slots provided for forming a baffled access extending between the adjacent outer row of rotor buckets of said rotor and an adjacent exhaust cavity in the respective stator half; a row of paired fuel mixture diffuser nozzles and ignition plugs with each pair spaced a predetermined distance apart from one another symmetrically about the rotor axis, thus dividing the turbine into expansion groups, and respectively extending diagonally through, in the direction of rotor rotation, and axially through one half only of such stator and terminating in a row internal to such stator half adjacent to the inner row of stator buckets therein and respectively provided for supplying a diffused compressed elastic fuel mixture to within the adjacent ends of said combustion chambers within said rotor, and for initially igniting such mixture within each such combustion chamber within such rotor; a plurality of rows of axially extending radial cooling fins with one row extending integral externally with each half of said stator; means for securing such halved stator to said compressor member and including means for rotatively supporting a shaft of said rotor concentrically rotative therein such compressor member; means for connecting an exhaust manifold, located radially outward externally to such stator halves, with each of such exhaust cavities and to a self activating, excess air induction, exhaust diffuser muffler; and, a jointly operative externally located manual means for controlling the number of fuel mixture diffuser nozzles and ignition plugs that are placed into and/or out of service progressively and for simultaneously regulating the amount of atomized solid fuel that will be injected into the compressed elastic fluid that is supplied through such jointly operative means proportionally to the number of fuel mixture diffuser nozzles that are placed into and/or out of service through such jointly operative means.

8. The internal combustion turbine of claim 7 characterized by, the curved rotor buckets and curved stator buckets of the turbine to consist of a series of annular rows of axially extending radially curved, in the direction of rotor rotation, of increasing in capacities radially outward, of inserted type of rotor buckets secured in axially extending serrated grooves machined in the sides of said rotor and wherein each such row of inserted type of rotor buckets cooperate with an adjacent annular row of series of similarly axially extending radially curved, in the opposite direction to rotor rotation, of similar type of inserted stator buckets, similarly increasing in capacities and similarly secured in axially extending serrated grooves, excepting with latter machined in the adjacent sides of each of such stator halves, and, wherein the inner row of stator buckets in each stator half of the last mentioned stator buckets are curved and connect the adjacent combustion chambers with the adjacent inner row of rotor buckets and do not form a continuous row of these stator buckets in either of such stator halves, and wherein the axial bucket clearances should be at a predetermined minimum clearance tolerance.

9. An internal combustion turbine comprising: a relatively narrow radially extending one direction rotative turbine rotor provided on both sides thereof with a series of annular rows of increasing in capacities radially outward of rotor expansion chamber buckets each curved in the direction of rotor rotation; a series of V-shaped combustion chambers symmetrically spaced around the axis of rotor rotation and each extending from opposite sides of such rotor diagonally axially convergingly in the direction of rotor rotation as twin tapering nozzles terminating together in the middle of the width of such rotor and forming an annular row of open ends of such combustion chambers on each side of such rotor with each row located a predetermined distance inward radially from the adjacent inner annular row of said rotor expansion chamber buckets; a plurality of annular rows of through diagonally axially extending air circulating holes located within said rotor inward radially from said annular rows of combustion chamber ends; an axially halved type of annular shaped turbine stator provided with its periphery closed and with both of its adjacent sides provided with a series of annular rows of increasing in capacities radially outward of stator expansion chamber buckets each curved in opposite to the direction of rotation of said rotor and cooperative with the adjacent annular rows of rotor expansion chamber buckets, and, wherein the inner row of such stator buckets of each stator half is not continuous and connect the adjacent row of combustion chamber ends with the adjacent inner row of rotor buckets; a plurality of rows of axially extending exhaust slots with one row located in each half of said stator outward radially from the outer row of stator buckets therein and each provided as a baffled access extending between the adjacent outer row of rotor buckets and an adjacent exhaust cavity in the respective stator half; a row of symmetrically spaced paired fuel mixture diffuser nozzles and ignition plugs, which divide the turbine into expansion groups, with each pair spaced a predetermined distance apart from one another and extending axially through one half only of such stator and terminating in a row internal to such stator half adjacent to the adjacent row of ends of said combustion chambers and respectively provided for supplying a diffused compressed elastic fuel mixture to within, and for initially igniting such mixture within each of such combustion chambers within said rotor; a plurality of rows of axially extending radial cooling fins with one row extending integral externally with each half of said stator means for connecting an exhaust manifold to said stator halves and the exhaust cavity in each, and, also to a self actuating, excess air induction, exhaust diffuser muffler; and, an externally located manually operative means for controlling the number of fuel mixture diffuser nozzles and ignition plugs that are placed into and/or out of service and simultaneously regulating the proportion of atomized solid fuel that will be injected into the fuel mixture being supplied according to the number of fuel mixture diffuser nozzles being placed into and/or out of service.

10. The internal combustion turbine of claim 9 characterized by, wherein the rotor and stator expansion chamber buckets of such turbine are both of axially extending curved conventional inserted type, with the rotor buckets thereof curved in the direction of rotor rotation and each provided to be secured in axially extending annular shaped serrated grooves located in both sides of such rotor, and with the stator buckets similar but curved in oppositely to rotor rotation and each being provided to be secured in similar serrated grooves located in the adjacent sides of said stator halves, and wherein the inner row of such stator buckets in each stator half is not continuous but is divided into said expansion groups, wherein each such group connects the adjacent combustion chamber ends with the adjacent first row of rotor buckets.

11. The internal combustion turbine of claim 9 characterized by, wherein the twin tapering nozzles are located at the opposite ends of each V-shaped combustion chamber and thereby each forms a separate reaction expansion nozzle and which results in an opposed twin jet type of reaction diffusion thrust from the expanding products of combustion within each combustion chamber during the normal rotative operation of the turbine rotor.

12. The internal combustion turbine of claim 9 exemplified by, wherein said row of symmetrically spaced paired fuel mixture diffuser nozzles and ignition plugs, extending through one half only of such stator, divide the turbine stator into a series of circumferentially extending opposed pairs of pressure velocity compounding expansion groups which results in a multitude of relatively small effective explosion impulses which per revolution of the rotor is equal to the number of combustion chambers multiplied by twice the number of single expansion groups, and could be 48×(2×6) and/or 576 of relatively light impulses per each revolution of the turbine rotor, so thus the number of power producing impulses per such revolution of said rotor is doubled by providing such combustion chambers to be double ended, likewise the heat distribution within the turbine is considerably improved thereby, and the axial thrust on the turbine rotor is balanced due to an axially opposed system of group expansion.

13. An internal combustion turbine, operative as the driving means of and in conjunction with a reversible unit motive power assembly, and, comprising: a relatively narrow, one direction rotative, radially extending turbine rotor provided on each side thereof with a series of annular rows, of increasing in capacities radially outward, of rotor buckets each curved in the direction of rotor rotation; a row of series of through diagonally axially extending V-shaped combustion chambers with the ends thereof located directly oppositely to one another axially and forming an annular row on each side of such rotor and each end of each combustion chamber extending diagonally convergingly into the adjacent side of such rotor, in direction of rotation of latter, and terminating together at the point of the V therein such rotor, and wherein each opposite end of each combustion chamber is capable of a jet type reaction diffusion thrust from expanding products of combustion during the normal rotative operation of such turbine rotor; a plurality of annular rows of through diagonally axially extending air circulating holes within said rotor inward radially from said row of combustion chambers; an axially halved type of annular shaped turbine stator provided with its periphery closed and its inner radius concentrically supported and secured, in relation to rotor rotation axis, upon and to an elastic fluid compressor member of and for such turbine, and provided on the adjacent sides of such stator with a series of annular rows, of similarly increasing in capacities, of stator buckets each curved in opposite to the direction of rotor rotation and co-operative with the adjacent rows of rotor buckets; a plurality of rows of axially extending radial exhaust slots with one row radially outward from each outer row of stator buckets within such halves of such stator and each row of slots provided for forming a baffled access extending between the adjacent outer row of rotor buckets and an adjacent exhaust cavity in the respective stator half; a row of paired diverging fuel mixture diffuser nozzles and ignition plugs with each pair spaced a predetermined distance apart from one another symmetrically about the rotor axis and respectively extending diagonally through, in the direction of rotor rotation, and axially through one half only of such stator and terminating in an annular row internal to such stator half adjacent to the inner row of stator buckets therein, and respectively provided for supplying a diffused compressed elastic fuel mixture to within the adjacent ends of said combustion chambers within said rotor, and for initially igniting such mixture within each such combustion chamber, which mixture is otherwise ignited by direct flame contact means; and wherein the turbine is divided into a series of axially oppositely located, quandrant shaped twin expansion groups, on either side of such rotor, wherein each twin group is provided, in the direction of rotor rotation, with one fuel diffuser nozzle and one ignition plug, and wherein such an arrangement provides twin group expansion within the turbine; a plurality of rows of axially extending radial cooling fins with one row extending integral externally with each stator half; an elongated one direction rotatable driving shaft secured to the turbine rotor and extending in common throughout said reversible unit motive power assembly as the rotatable driving means thereof; means for connecting an exhaust manifold, located radially outward to such stator halves, with each of such exhaust cavities, and to a self activating, excess air induction and circulating exhaust diffuser muffler; means for rotatively starting such turbine rotor with compressed elastic fuel mixture supplied via said fuel diffuser nozzles to said combustion chambers; and, a jointly operative turbine control and fuel mixture distributing valve unit, for controlling the number of fuel mixture diffuser nozzles and ignition plugs that are placed into and/or out of service progressively, and for simultaneously regulating an amount of atomized solid liquid fuel that will be pressure atomized and injected into such fuel mixture distributing unit proportionally to the number of fuel mixture diffuser nozzles and ignition plugs that are placed into and/or out of service thereby such distributing unit.

14. The internal combustion turbine of claim 13 characterized by, said means for starting such turbine rotor with compressed elastic fuel mixture supplied to said combustion chambers, to consist of: a pressure reservoir containing compressed elastic fluid received from said compressor via said fuel mixture distributing unit through a tubing access connection which extends from latter to said reservoir via a non-return ball check-valve; means connecting latter, below the ball, with said reservoir via an electrical solenoid coil operative check-valve; a manually operative electrical push button for supplying electricity to the solenoid coil of such solenoid coil operative check-valve; and, whereby during the operation of said push-button, compressed elastic fluid is supplied from such reservoir, via said jointly operative means, and via any number of said diffuser nozzles in use to each of said combustion chambers in sequence as said turbine rotor is rotatively started.

15. The internal combustion turbine of claim 13 characterized by, said means for connecting an exhaust manifold with each of such exhaust cavities, in the stator halves, and to a self activating, excess air induction, exhaust diffuser muffler, to consist of: an elongated cored manifold provided with one end closed and adapted to be bolted to each stator half and in communication with the respective exhaust cavities of latter; an elongated cylindrical exhaust pipe extending from said manifold, at one end, concentrically a predetermined distance into a cylindrical muffler at its opposite end; an annular shaped air induction pipe concentrically surrounding the muffler end of said exhaust pipe within such muffler and extending a predetermined distance within latter beyond the adjacent end of such exhaust pipe and forming an annular shaped air induction space external to latter; a similar annular shaped 2nd air induction pipe, concentrically surrounding the last mentioned annular shaped pipe, and extending beyond latter a predetermined distance within such muffler and provided with an annular shaped air induction space internal and external thereto such 2nd pipe; a downward directing baffle at opposite end of such muffler to said exhaust pipe; and, whereby when exhaust products of combustion are passing through said exhaust pipe into such muffler, excess air is drawn into latter by self activating induction means through such annular shaped air induction spaces mentioned, and, for burning any hydrocarbons remaining in such exhaust, and thereby assisting in smog prevention as well as diffusing and silencing such exhaust products of combustion.

References Cited in the file of this patent

UNITED STATES PATENTS

| | | |
|---|---|---|
| 2,667,744 | Butler | Feb. 2, 1954 |
| 2,680,949 | Butler | June 15, 1954 |
| 2,809,493 | Pavlecka | Oct. 15, 1957 |